(12) United States Patent
Sassine et al.

(10) Patent No.: US 7,898,771 B2
(45) Date of Patent: Mar. 1, 2011

(54) HEAD SUSPENSION ASSEMBLY HAVING A HIGH DAMPING HIGH STIFFNESS COMPONENT

(75) Inventors: Joseph H. Sassine, Lakeville, MN (US); Sandeepan Bhattacharya, Eagan, MN (US); Andrew J. Hutchinson, New Prague, MN (US); Joel D. Limmer, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 625 days.

(21) Appl. No.: 10/788,863

(22) Filed: Feb. 27, 2004

(65) Prior Publication Data

US 2005/0190502 A1    Sep. 1, 2005

(51) Int. Cl.
  *G11B 21/16*    (2006.01)
(52) U.S. Cl. .................................... 360/244.8
(58) Field of Classification Search ............. 360/244.8, 360/245
  See application file for complete search history.

(56) References Cited

U.S. PATENT DOCUMENTS

| | | | |
|---|---|---|---|
| 4,734,805 A * | 3/1988 | Yamada et al. .......... | 360/244.8 |
| 4,760,478 A | 7/1988 | Pal et al. | |
| 4,812,935 A | 3/1989 | Sleger | |
| 4,819,094 A | 4/1989 | Oberg | |
| 4,933,792 A | 6/1990 | Sleger et al. | |
| 5,187,625 A | 2/1993 | Blaeser et al. | |
| 5,446,611 A | 8/1995 | Webber | |
| 5,483,397 A | 1/1996 | Gifford et al. | |
| 5,606,477 A | 2/1997 | Erpelding et al. | |
| 5,761,184 A * | 6/1998 | Dauber et al. ............... | 720/694 |
| 5,771,135 A | 6/1998 | Ruiz et al. | |
| 5,774,305 A | 6/1998 | Boutaghou | |
| 5,796,553 A | 8/1998 | Tangren | |
| 5,839,193 A | 11/1998 | Bennin et al. | |
| 5,844,751 A | 12/1998 | Bennin et al. | |
| 5,943,191 A | 8/1999 | Giere et al. | |
| 5,949,617 A * | 9/1999 | Zhu ......................... | 360/244.8 |
| 5,965,249 A * | 10/1999 | Sutton et al. ............. | 428/304.4 |
| 6,005,750 A | 12/1999 | Willard et al. | |
| 6,212,043 B1 | 4/2001 | Nakamura et al. | |
| 6,222,704 B1 * | 4/2001 | Aoyagi et al. ............ | 360/244.9 |
| 6,271,996 B1 | 8/2001 | Houk et al. | |
| 6,307,715 B1 | 10/2001 | Berding et al. | |
| 6,361,740 B1 | 3/2002 | Zamanzadeh et al. | |
| 6,459,549 B1 | 10/2002 | Tsuchiya et al. | |
| 6,498,704 B1 | 12/2002 | Chessman et al. | |
| 6,522,050 B2 | 2/2003 | Sivadasan et al. | |

(Continued)

OTHER PUBLICATIONS

Steelnext.com Glossary entries, Jun. 25, 2007.*

(Continued)

*Primary Examiner*—Julie Anne Watko
(74) *Attorney, Agent, or Firm*—Kinney & Lange, P.A.

(57) ABSTRACT

A head suspension assembly for carrying a slider assembly in a disc drive has a beam component having a front end and a rear end, a hinge component near the rear end of the beam component for connecting to an actuation means, and a gimbal component near the front end of the main beam section for carrying a transducing head. At least one of the hinge component and the gimbal component is made from a structural damping material having high stiffness and high damping capacity.

24 Claims, 4 Drawing Sheets

U.S. PATENT DOCUMENTS

| | | | |
|---|---|---|---|
| 6,549,375 B1 | 4/2003 | Crane et al. | |
| 6,549,376 B1 | 4/2003 | Scura et al. | |
| 6,636,382 B2 * | 10/2003 | Shiraishi | 360/244.3 |
| 6,731,466 B2 * | 5/2004 | Arya | 360/244.3 |
| 6,785,094 B2 * | 8/2004 | Arya et al. | 360/244.3 |
| 6,985,333 B1 * | 1/2006 | Hiller et al. | 360/235.5 |
| 7,054,109 B2 * | 5/2006 | Erpelding | 360/244.2 |
| 7,224,554 B2 * | 5/2007 | Wright | 360/244.3 |
| 2003/0202284 A1 * | 10/2003 | Arya | 360/244.3 |
| 2004/0120078 A1 * | 6/2004 | Berding et al. | 360/245.9 |
| 2005/0135013 A1 * | 6/2005 | Sassine et al. | 360/244.9 |

OTHER PUBLICATIONS

Lim et al, "Design and Load/Unload Performance of Hard Disk Drive Suspension Integrated With Shape Memory Alloy Thin Film", IEEE Transactions on Magnetics, v. 43, No. 5, May 2007.*

çolakoğlu, "Damping and Vibration Analysis of Polyethylene Fiber Composite under Varied Temperature", Turkish J. Eng. Env. Sci., No. 30 (2006), p. 351-357.*

Kenney, J.F. and Keeping, E.S., "Mathematics of Statistics Part One", Princeton, NJ: D. Van Nostrand Co., Inc. (1954) pp. 8-9.*

* cited by examiner

HEAD SUSPENSION ASSEMBLY HAVING A HIGH DAMPING HIGH STIFFNESS COMPONENT

CROSS-REFERENCE TO RELATED APPLICATION(S)

None.

BACKGROUND OF THE INVENTION

The present invention relates to a head suspension assembly in a disc drive, such as a hard drive using a magnetic storage medium. More particularly, the present invention relates to a disc drive head suspension assembly using a damping material to reduce high frequency vibration.

Disc drives are one of the key components to store data in a computer system. In a basic hard disc drive, data is stored in a magnetic medium formed on a surface of a rotating disc. The hard disc drive reads and writes information stored on tracks on a disc bearing the magnetic medium. To do this, a read/write head that includes a transducer carried by a slider assembly is placed in close proximity to the surface of the magnetic medium; The slider is attached through a gimbal system to a distal end of head suspension which, includes the head suspension. The proximal end of the head suspension is attached to an actuator arm which is rotatably controlled by a voice coil motor (VCM). The disc drive system sends control signals to the voice coil motor to move the actuator arm and the suspension supporting the read/write head across the disc in a radial direction to the target track. The positioning of the read/write head over the magnetic medium is controlled by a closed, loop circuit for better accuracy. In addition to the active controlling signal from the closed loop circuit, the precise positioning of the read/write head is affected by a dynamic balance between two vertical forces. The first force is a gram load applied by the head suspension to bias the head toward the disc surface. The second force is an air bearing lifting force caused by the fast motion between the slider and the disc surface. Roughly, the control system controls tracking (i.e., radial positioning of the head) while the dynamic balance determines fly-height (i.e., head-media spacing). However, as the areal density of concentric data tracks on magnetic discs continues to increase (that is, the size of data tracks and radial spacing between data tracks decrease), hard disc systems also use active control for more precise vertical positioning of the head.

One of the most significant adversarial conditions affecting precise positioning of the read/write head in a disc drive system is vibration, particularly that caused by head suspension resonance. Many types of vibration exist in a disc drive system to cause fluctuation of the magnetic read/write head positioning. In particular, vibrations resulting from resonances of the system are often serious obstacles in improving areal density and rotation speed of the disc drive system. Every closed loop servomotor system has a bandwidth, and resonances occurring within the bandwidth degrade the performance of the servomotor system. In a hard disc drive, for example, windage excitation (fluid turbulence caused by airflow) can cause head vibration at resonance frequencies of the head suspension assembly and thus cause the head suspension assembly to have large displacement amplitudes. Windage, however, is not the only source that can cause resonance in a hard disc drive system. In today's high-speed hard disc drives, the servomotor that moves the parts at high frequency may also cause resonance. In addition, when it is desired to position the magnetic head to a specific track location, the voice coil motor is driven by a voltage that has a very short rise time to accelerate the actuator very quickly. Once the actuator is in motion, the voltage levels off and the actuator approaches a constant velocity. As the actuator approaches the target location on the disc, a similar, but inverse abrupt voltage pattern is applied to the voice coil motor to stop the suspension actuator. This sequence of voltage change is best represented by a square wave, which is a superposition of many waves of different frequencies, according to Fourier transform. The operation of the servo system in a hard disc drive to move the suspension head assembly thus has inherent frequency components that may excite resonance.

Resonance degrades the performance of a disc drive in several ways. First, severe resonance, especially that of sway or torsion mode, may cause the magnetic read/write head to move away from the target track and thus result in data reading/writing error. Second, resonance in the vertical direction, such as that caused by resonance in bending mode, may cause fluctuations in the fly height of the read/write head to result in data error as well. In extreme cases, vertical fluctuations may even cause catastrophic damage of the disc drive due to direct contact between the head and the disc surface. Third, during resonance, the transducer element of the read/write head is forced to modulate, causing a significant decrease in the signal to noise ratio of the system and increase of the non-repeatable run-out (NRRO).

Significant efforts have been made to alleviate the problem of resonance. Various methods have been used to address the problem of resonance. The product design is essentially an optimization of the system involving a balance of several factors, often gaining on one aspect at a cost of sacrificing another, as commonly found for a spring-mass-damper system.

With the increasing demand for disc drives that are more reliable, quieter and faster, and have larger storage capacity (with increased areal density) and smaller overall disc size, there is an increasing need for a disc drive suspension system having better balanced optimization between several performance properties including damping property, stiffness and the structural integrity.

BRIEF SUMMARY OF THE INVENTION

The present invention is a head suspension assembly for carrying a slider assembly in a disc drive. The head suspension assembly has a beam component having a front end and a rear end, a hinge component near the rear end of the beam component for connecting to an actuation means, and a gimbal component near the front end of the main beam section for carrying a transducing head. At least one of the hinge component and the gimbal component is made from a structural damping material having high stiffness and high damping capacity. In one embodiment, the structural damping material is an alloy in another embodiment, the structural damping material is a laminate comprising a stainless steel layer and a damping material layer.

The present invention is also a method for fabricating a vibration resistant head suspension assembly. The method includes the steps of fabricating a beam component using a first material having high stiffness, fabricating an end component using a second material having high stiffness and high damping capacity, and attaching the end component to the beam component such that the end component and the beam component is movable together through an actuation means.

The invention utilizes a realization that a component of the head suspension assembly can be made from a material having high stiffness and high damping capacity to significantly reduce vibration resonance without substantially sacrificing the overall stiffness of the head suspension assembly. The invention also utilizes a realization that a component having a high strain or high stress region, such as the hinge portion or the gimbal portion, are best candidates to be made from a high stiffness and high damping capacity material in accordance with the present invention.

BRIEF DESCRIPTION OF THE DRAWINGS

The present invention will be further explained with reference to the drawing figures listed below, wherein like structure is referred to by like numerals throughout the several views.

DETAILED DESCRIPTION

Figure 1:
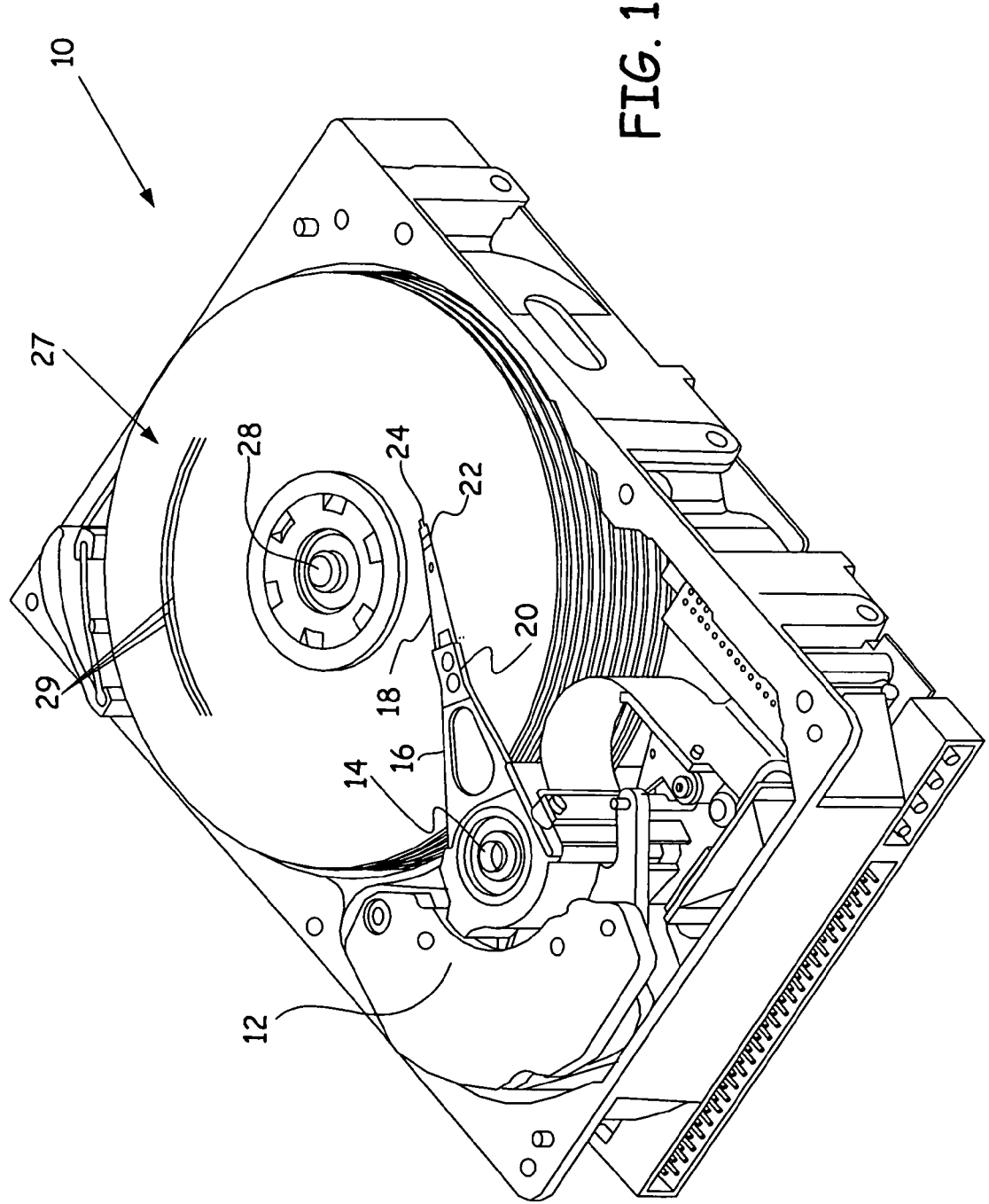
FIG. 1 is a perspective view of a disc drive including the head suspension assembly and an actuation system for positioning a slider over tracks of a disc.

FIG. 1 is a perspective view of a disc drive 10 which includes voice coil motor (VCM) 12 arranged to rotate actuator arm 16 on spindle around axis 14. Head suspension assembly 18 is connected to actuator arm 16 at heads mounting block 20. Head suspension assembly 18 includes gimbal assembly 22, which is connected to a distal end of head suspension assembly 18, and carries slider 24. Slider 24 carries a transducing head (not shown) for reading and/or writing data on disc 27, which rotates around axis 28 and includes concentric tracks 29 on which the data is written.

Figure 2:
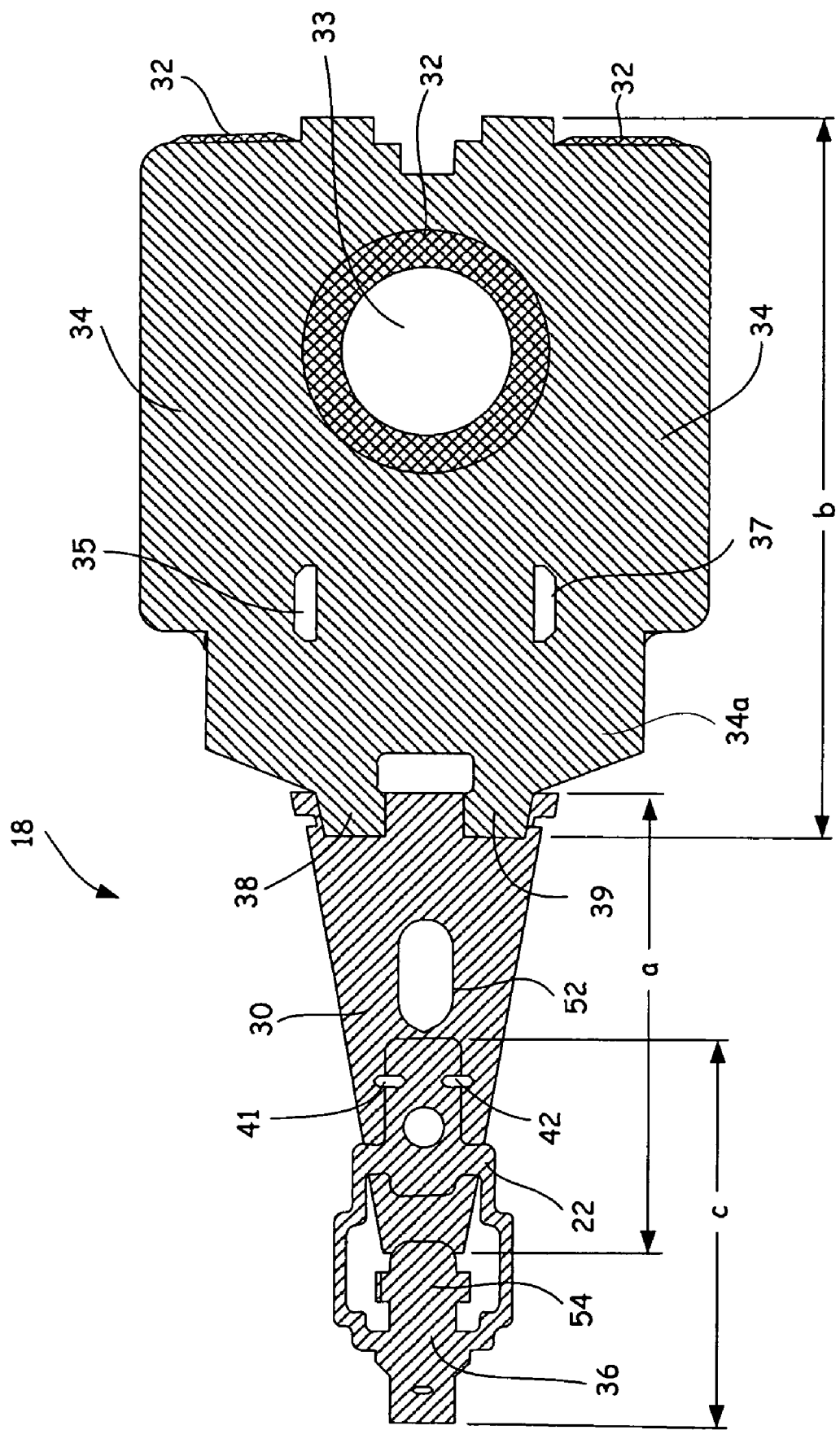
FIG. 2 is an ABS plan view of a head suspension assembly in accordance with the present invention.

FIG. 2 is a plan view of head suspension assembly 18 in accordance with the present invention viewed from ABS (air bearing surface). Head suspension assembly 18 has beam component 30 spanning longitudinally the range denoted by "a", hinge component 34 spanning longitudinally the range denoted by "b", and gimbal component 36 spanning longitudinally the range denoted by "c". In this description, the longitudinal direction is along the conventional length of the head suspension. Although somewhat arbitrary, in this description the longitudinal end of beam component 30 close to hinge component 34 is referred to as the rear end, while the longitudinal end of beam component 30 close to gimbal component 36 is referred to as the front end.

Hinge component 34 is attached close to the rear end of beam component 30 at connecting points 38 and 39. Gimbal component 36 is attached close to the front end of beam component 30 at connecting points 41 and 42. When used in disc drive 10 (FIG. 1), gimbal component 36 connects to slider assembly 24 (not shown in FIG. 2, shown in FIG. 1), which carries a transducing head (not shown in FIG. 2).

Hinge component 34 is stacked on baseplate 32 and connected thereto through connecting points 35 and 37. Baseplate 32 has mounting hole 33 for attaching head suspension assembly 18 to actuator arm 16 (FIG. 1) and mounting block 20 (FIG. 1).

In one embodiment in accordance with the present invention, hinge component 34 is made from a structural damping material having high stiffness and high damping capacity.

In this description, the term "structural damping material" refers to a damping material that is used to at least partially fabricate a component (e.g., hinge component 34). A structural damping material thus constitutes at least an integral part of the component rather than a part added to the component after the component has been made. In comparison, a damping material can be any material having damping characteristics. Examples of structural damping materials having high stiffness and high damping capacity are discussed in a later part of this description.

The use of a structural damping material having high stiffness and high damping capacity to make hinge component 34 significantly improves the resonance performance of head suspension assembly 18 without sacrificing the overall stiffness and mechanical integrity of head suspension assembly 18. This is accomplished by reducing the modal amplitudes of the suspension while maintaining the high modal frequencies.

The effectiveness of the invention is believed to be at least partially attributable to the fact that the hinge area of the suspension in a disc drive carries the load and has a maximum concentration of the strain energy in all major suspension resonance modes. The high concentration of strain energy in the hinge area leads to high efficiency of energy dissipation in that area, thus maximizing the damping effect.

Alternatively, gimbal component 36 may be made from a structural damping material having high stiffness and high damping capacity. Like hinge component 34, gimbal component 36 also tends to have a high concentration of strain energy and thus is a good candidate for applying the invention concept.

Furthermore, both hinge component 34 and gimbal component 36 may be made from a structural damping material having high stiffness and high damping capacity. The structural damping material used to make hinge component 34 and gimbal component 36 may either be identical or different in material composition, and further either be identical or different in thickness.

Conventionally, hinge components and gimbal components in head suspension assemblies are made from stainless steel materials with little inherent damping capacity. The stainless steel materials used for making hinge components and gimbal components are often the same as or similar to the material, most commonly sheet stainless steel, used for making the main suspension beam itself. Resonance performance of the conventional head suspension assembly is partially achieved by increasing modal frequencies of the suspension assembly, which in turn is achieved by either increasing the stiffness of the suspension components or by reducing the length of the suspension. These measures, however, often compromise the fly-ability of the slider assembly carrying a transducing head and have negative impacts on the manufacturability and assembly of the head stack that eventually goes into the disc drive. Typically, resonance performance of the conventional head suspension assembly is partially achieved by applying add-on external dampers. The usefulness of such external dampers is limited because it is difficult to apply the external dampers to the exact places where strain is highest and where the damping would have most effect. This is so because high strain areas are often fragile and have odd shapes with low tolerances, and also because these relevant areas often have very small sizes. Accurately targeting a high strength area without causing damage is thus difficult, and even if possible, costly from manufacturing point of view.

Using a structural damping material having high stiffness and high damping capacity for making a high-strain area (e.g., hinge component 34 and gimbal component 36 in FIG. 2) in accordance with the present invention inherently eliminates the difficulties of accurately positioning and deploying an external add-on damper in prior art. At the same time, use of high stiffness materials for all major components of the head suspension assembly (e.g., beam component 30, hinge component 34, and gimbal component 36 in FIG. 2) ensures that there is no significant sacrifice on the overall stiffness and mechanical integrity of the head suspension assembly. The resultant head suspension assembly thus also maintains high frequency for the vibration modes.

It should be noted that although hinge component 34 as shown in FIG. 2 covers the entire baseplate 32, it is not inherently required to be so in accordance with the present invention. Significantly, because the high strain areas on hinge component 34 tend to be concentrated on an end close to beam component 30 (i.e., the end that is connected to beam component 30 through connecting points 38 and 39), it is within the sphere of the present invention to make only an end section (generally denoted as 34a in FIG. 2) using the structural damping material in accordance with the present invention.

As known in the art end section 34a often has an arc shape (i.e., bending out of the paper plane of FIG. 2, not shown) for the purpose of applying a preload on slider 24 through load beam 30. For the same reason, end section 34a is often required to be springy.

A high strain component (hinge component 34 or gimbal component 36) may be separately made and subsequently, attached to beam component 30. The method of fabrication of a high strain component using a structural damping material having high stiffness is selected according to the properties of the material. For example, the process of fabrication may start with a bulk piece of the material and subsequently cut the material into individual components. Cutting may be performed using any suitable methods such as Electric Discharging Machining (EDM) or etching Although EDM is relatively accurate and suitable for development work, etching may be preferred in actual production to realize a simple cookie cutter process rather than removing materials on individual areas to create a desired shape.

The exact design of the gimbal mechanism of gimbal component 36 and the mechanism for mounting the slider assembly on gimbal component 36 are not essential to the present invention. Various designs available in the art may be used. Furthermore, structural appearance of head suspension assembly 18 in FIG. 2, such as the shape of each component, the longitudinal overlaps between two neighboring components, and exact mounting positions connecting a component to another part of the disc drive, are nonessential for the present invention.

Various methods, including gluing using a suitable adhesive and welding methods, may be used for attaching a high strain component to another component (such as beam component 30) in the disc drive. The method should be selected according to the properties of the materials. When a welding method is used, connecting points 38, 39, 41 and 42 shown in FIG. 2 are welding points. Specifically hinge component 34 is welded to beam component 30 at welding. points 38 and 39, while gimbal component 36 is welded to beam component 30 at welding points 41 and 42. Both conventional welding methods and laser welding may be used. The specific method for attaching a component to another component is not essential to the present invention. Furthermore, the locations of connecting points 38, 39, 40 and 42 are not required to be exactly at the two ends of beam component 30, and correspondingly, there may be a certain amount of overlap in the longitudinal direction among beam component 30, hinge component 34 and gimbal component 36. In general, however, hinge component 34 and gimbal component 36 are separated from each other, with the former being closer to the rear end of beam component 30 and the latter being closer to the opposite front end of beam component 30.

A variety of damping materials may be used as the structural damping material in accordance with the present invention. The essential requirement for a structural damping material to be suitable for the purpose of the present invention is that the damping material must both have sufficiently high stiffness and sufficiently high damping capacity. Other properties that need to be considered include connectability (such as weldability) between the components, manufacturability (such as cutability, the degree of freedom of the shape and size, and properties in an as cast state) of the materials, and temperature sensitivity. Particularly, damping is sensitive to temperature. Many materials have diminished damping capacity at low temperatures. The structural damping material should demonstrate sufficiently high damping capacity at the operating temperature of the head suspension assembly in a disc drive. The operating temperature of a typical hard disc drive is 45-75° C.

Preferably, the structural damping material in accordance with the present invention should have a modulus of elasticity greater than 30 gigapascals ($4.35 \times 10^5$ psi), and a damping capacity $\zeta$ (Zeta) greater than 0.02 in the vibration mode of concern. More preferably, the structural damping material should have a modulus of elasticity greater than 50 gigapascals ($7.25 \times 10^6$ psi), and a damping capacity greater than 0.05 in a vibration mode of concern.

There are several different and alternative ways to describe the damping property of a damping material. One way is to use logarithmic decrement $\delta = 1/n \times Ln$ (initial amplitude/nth vibration amplitude). As its definition shows, $\delta$ directly measures the decreasing speed of vibration amplitude. The theoretical maximum of $\delta$ is 1. With $\delta = 0.5$, most of external energy is absorbed after the first cycle of vibration. With $\delta = 0.1$, approximately half of the external energy is absorbed after the first cycle of vibration. The extreme case in which $\delta = 0$ represents an ideal spring in which vibration energy remains constant (i.e., no external energy is absorbed to vibration).

Derived from logarithmic decrement $\delta$ is damping capacity $\zeta = \delta/2\pi$. Similar to that in $\delta$, a higher value of damping capacity $\zeta$ corresponds to a better damping property. As an illustration, the conventional stainless, steel material such as the commercially available SST302 has a damping capacity $\zeta = 0.005$. Therefore, a damping material having a $\zeta = 0.02$ has a damping capacity four times as high as that of stainless steel SST302.

Stiffness is one of the several aspects of the general strength of a material. Specifically, stiffness is a measure of a material's resistance to bending. Because bending includes both plastic and elastic behavior, stiffness is closely related to, but not the same as, the apparent value of elastic modulus or modulus of elasticity, which is a direct measure of the ability of a material to return to its original shape when the bending load causing deformation is removed. Generally, a high modulus of elasticity corresponds to high stiffness.

Another parameter to measure the strength of a material is tensile strength, which is the ultimate strength of a material subjected to tensile loading or tensile force, or the maximum stress developed and maintained in a material in a tension test. Although two different physical properties, stiffness and tensile strength are closely related to one another. Generally, a material with high tensile strength also has high stiffness.

Alternate to tensile strength is tangent or secant modulus of elasticity of a material subject to tensile loading, namely Young's modulus of elasticity. Like other types of modulus of elasticity, Young's modulus of elasticity is often given as the force per unit cross-sectional area, e.g., kilograms per square centimeter, pounds per square inch (psi), or newtons per square meter (pascals or Pa). For example, Young's modulus of elasticity of stainless steel SST302 is about 210 GPa (gigapascals). Stainless steel SST302 is commercially available and commonly used for making head suspension assemblies in disc drives. In comparison, Young's modulus of elasticity of aluminum, glass, and polystyrene is about 75 GPa, 60 GPa and 3 GPa, respectively.

In accordance with the present invention, a material having high stiffness should have a Young's modulus of elasticity greater than 10 GPa Preferably, a damping material having high stiffness in accordance with the present invention should have a Young's modulus of elasticity greater than 30 GPa, and more preferably greater than 50 GPa. In a case where a composite material is used as the structural damping material of high stiffness, the composite material should have a nominal, or average Young's modulus of elasticity greater than 10 GPa, preferably greater than 30 GPa, and more preferably greater than 50 GPa.

Various materials are available that satisfy the above described requirements for a structural damping material having high stiffness and high damping capacity. A nonexclusive exemplary list of such materials includes high damping, alloys, composite damping materials, and laminate damping materials. A more detailed description of these exemplary materials is given below.

High damping alloys have relatively high damping capacity without significantly sacrificing the mechanical property (such as stiffness) of the alloy. An example suitable for the purpose of the present invention is Star Silent high damping alloy, a product of Daido Steel Co. LTD, Japan. High Strength (HS) Star Silent D2052, for example, has a damping capacity $\zeta=0.11$ (approximately 22 times that of the conventional stainless steel SST302), and a Young's modulus of elasticity $E=75$ GPa (approximately one third of stainless steel SST302, and close to that of aluminum). The other properties of HS Star Silent D2052 are: density=7.25 Mg/m$^3$; specific heat=512.7 J/kg K; thermal conductivity 10 W/m K; and thermal expansion coefficient $22.4 \times 10^{-6}$/K.

The high damping capacity of HS Star silent alloys relates to formation and multiplication of internal twin boundaries when the alloy is under stress. High-speed movement of these internal twin boundaries results in large internal friction and thus high damping ability. Similar high damping alloys are found in Japanese patents JP27242977 (equivalent: JP2849698B2), JP7242999, and JP10280109, and U.S. Pat. No. 6,361,740.

In addition to high damping alloys, another type of materials in suitable for the purpose of the present invention is composite damping materials, such as that disclosed in U.S. Pat. Nos. 5,965,249 and 6,346,132. In accordance with the present invention, such composite materials, may be used as a structural damping material having high damping capacity and high stiffness to make a high stress component of the head suspension assembly, rather than as a conventional external damper.

In addition to high damping alloys and composite materials, another type of material suitable for the purpose of the present invention is laminated damping materials (which, in a broader sense, are a special type of composite materials). An example of laminated materials having high stiffness and high damping capacity is QuietSteel®, a product of Material Sciences Corporation, Elk Grove Village, Ill., USA.

In general, laminated materials having a core of damping material laminated (e.g., sandwiched) between sheet materials of high stiffness, such as that described in U.S. Pat. No. 5,187,625, are suitable for the purpose of the present invention as long as the laminate material has a sufficiently high stiffness and a sufficiently high damping capacity. In accordance with the present invention, such laminated materials may be used to make a high strain component of a head suspension assembly, rather than to make the entire head suspension assembly.

More elaborate laminated structures such as that disclosed in co-assigned U.S. patent application Ser. No. 10/610,788, entitled "SUSPENSION LOAD BEAM: WITH A COMPOSITE DAMPING CORE", filed on Jun. 30, 2003, are also suitable to make a high strain component (a hinge component or gimbal component) in accordance with the present invention. U.S. patent application Ser. No. 10/610,788 is hereby incorporated by reference. In that patent application, a laminate composite is used to make a main beam section of the head suspension assembly. The laminate composite has a rigid bottom layer, a rigid top layer and a composite core layer sandwiched between the bottom layer and the top layer. The composite core layer comprises a damping material and a rigid material and is coextensive with the rigid bottom layer. In one embodiment disclosed therein, the composite core layer is a multilayer laminate structure having a layer of the damping material and a layer of the rigid material, the two layers being coextensively laminated together. In accordance with the present invention, instead of making the main beam section of a head suspension assembly as disclosed in the above patent application, similar laminated composite materials may be used to make a high strain component (a hinge component or gimbal component).

EXAMPLES

Finite Element (FE) simulations are performed to compare a head suspension assembly according to prior art (Baseline Design) and a head suspension assembly in accordance with the present invention (High Damping Design).

Baseline Design is a head suspension assembly based on prior art. The beam component is made of 0.002" SST302 stainless sheet material. The hinge component is made of 0.001" SST302 stainless sheet material. The gimbal component is made of 0.00078" SST302 stainless sheet material. The baseplate is made of 0.0059" SST301 stainless sheet material.

High Damping Design is a head suspension assembly in accordance with the present invention. The beam component is made of conventional 0.002" SST302 stainless sheet material. The hinge component is made of 0.002" HS Star Silent® sheet material. The gimbal component is made of 0.00078" HS Star Silent® sheet material. The baseplate is made of 0.0059" conventional SST301 stainless sheet material.

TABLE 1 shows FE simulation results of resonance-performance comparison of Baseline Design and High Damping Design.

TABLE 1

| | Units | Baseline Design | High Damping Design |
|---|---|---|---|
| First bending | Hz | 6237 | 6010 |
| First torsion | Hz | 9027 | 9976 |
| Second bending | Hz | 14534 | 12150 |
| Second torsion | Hz | 22959 | 22650 |
| Sway | Hz | 19495 | 18645 |
| Gimbal First bending | Hz | 13527 | 7886 |
| Gimbal first torsion | Hz | 14050 | 8490 |
| Spring rate | gram-force/in | 52 | 56 |

TABLE 1-continued

|  | Units | Baseline Design | High Damping Design |
|---|---|---|---|
| Pitch stiffness | μNm/deg | 0.75 | 0.4 |
| Role stiffness | μNm/deg | 0.83 | 0.38 |

Figure 3:
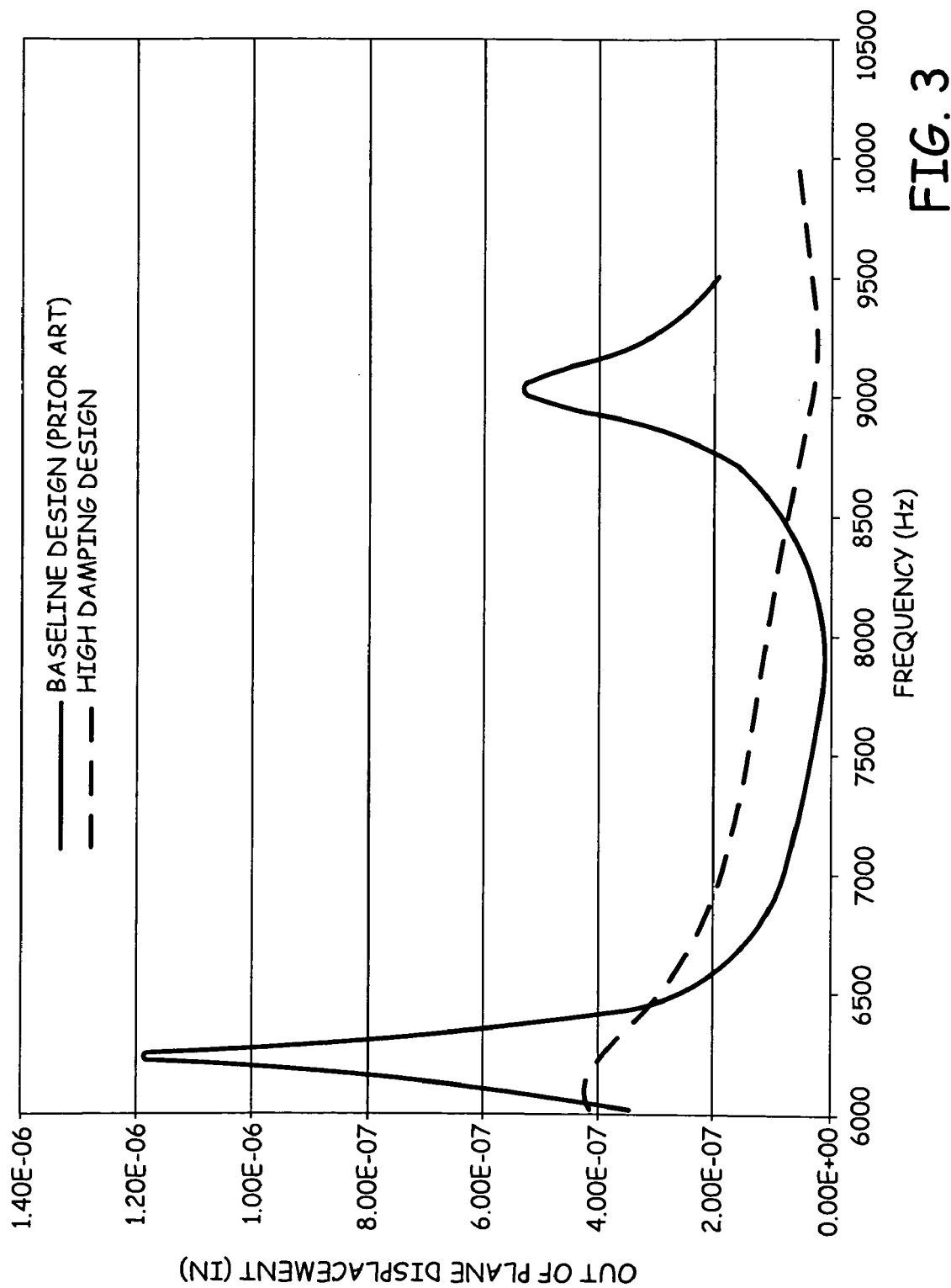
FIG. 3 is a graph showing, in comparison, out of plane displacements caused by the first bending and first torsion modes at a location on a conventional head suspension assembly and on the head suspension assembly in FIG. 2 according to the present invention.

FIG. 3 shows the FE simulation results of out of plane displacement measured on location 52 (FIG. 2) on the middle of beam component 30. The out of plane displacement is a result of vibrations in bending mode or torsion mode. In the simulations, the measured out of plane displacement is caused by lateral excitation initiated at a location near mounting hole 33 (FIG. 2). The solid line represents the result of Baseline Design (prior art) and the dotted line represents the result of High Damping Design in accordance with the present invention. The comparative results shown in FIG. 3 demonstrate that out of plane displacement is significantly reduced at all vibration frequencies in the High Damping Design.

Figure 4:
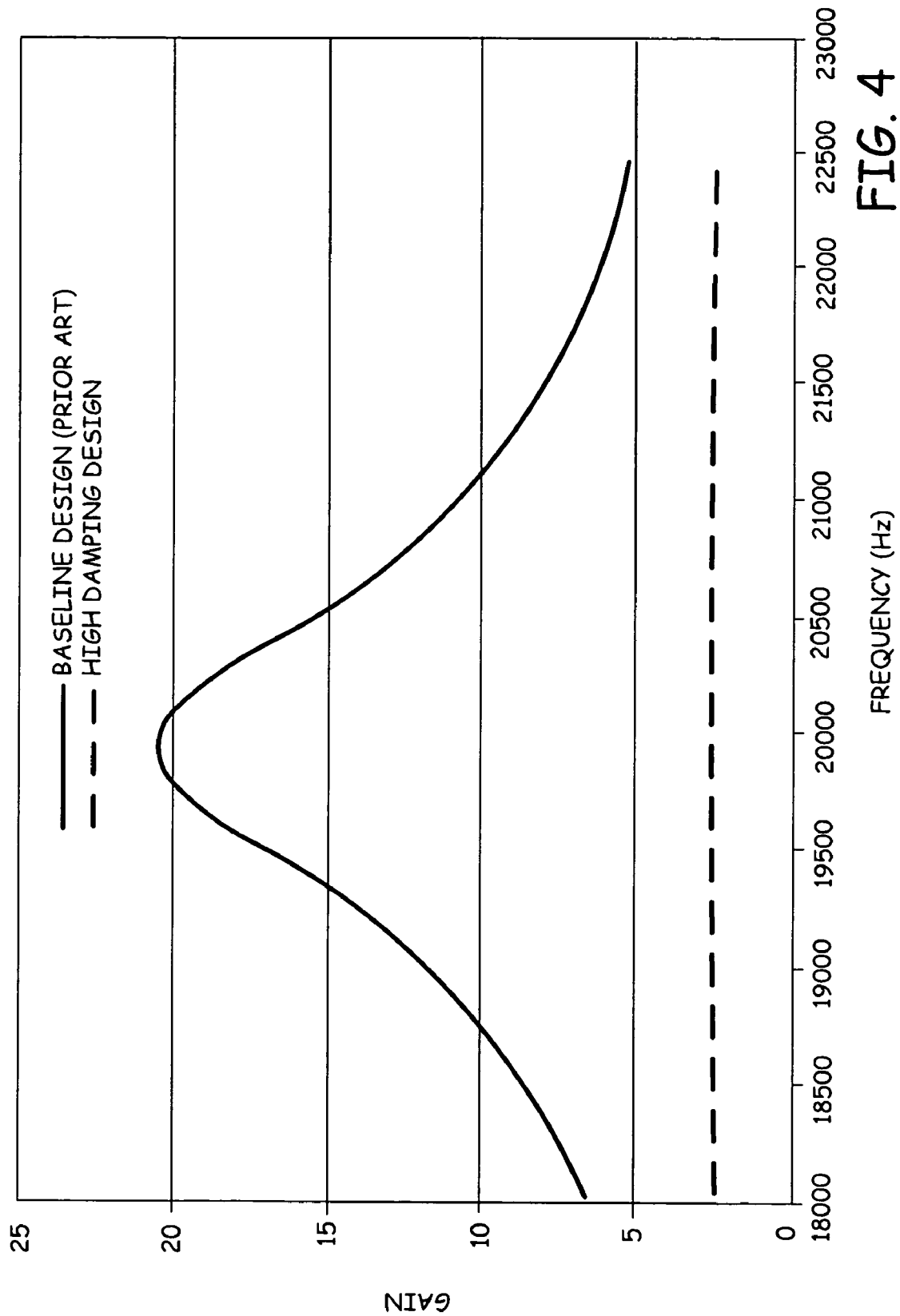
FIG. 4 is a graph showing, in comparison, slider off-track gains caused by the sway mode at a location on a conventional head suspension assembly and on the head suspension assembly in FIG. 2 according to the present invention.

FIG. 4 shows the FE simulation results of slider off-track gain measured (FIG. 2) on location 54 (FIG. 2) on gimbal component 36. The slider off-track gain is a result of vibrations in sway mode. In the simulations, the measured slider off-track gain is caused by lateral excitation initiated at a location near mounting hole 33 (FIG. 2). The solid line represents the result of Baseline Design (prior art) and the dotted line represents the result of High Damping Design in accordance with the present invention. The comparative results shown in FIG. 3 demonstrate that slider off-track gain is also significantly reduced at all vibration frequencies in the High Damping Design.

The use of a structural damping material having high stiffness and high damping capacity in accordance with the present invention overcomes several inherent problems in the prior art. The invention reduces, or eliminates, the necessity for attaching an external damper on a surface of the head suspension assembly.

Although the present invention has been described with reference to preferred embodiments, workers skilled in the art will recognize that changes may be made in form and detail without departing from the spirit and scope of the invention.

The invention claimed is:

1. A head suspension assembly, comprising:
a beam component having a front end and a rear end;
a hinge component near the rear end of the beam component for connecting to an actuation arm; and
a gimbal component near the front end of the beam component for carrying a transducing head;
wherein the hinge component comprises a first structural damping material having a modulus of elasticity greater than approximately 10 gigapascals and a damping capacity greater than approximately 0.02 in a vibration mode having a frequency between about 6,010 hertz and about 22,650 hertz and the gimbal component comprises a second structural damping material having a modulus of elasticity greater than approximately 10 gigapascals and a damping capacity greater than approximately 0.02 in a vibration mode having a frequency between about 6,010 hertz and about 22,650 hertz; and
wherein at least one of the hinge component and the gimbal component is separately made and attached to the beam component.

2. The head suspension assembly of claim 1, wherein the first structural damping material has a modulus of elasticity greater than approximately 30 gigapascals in a vibration mode having a frequency between about 6,010 hertz and about 22,650 hertz, and the second structural damping material has a modulus of elasticity greater than approximately 30 gigapascals in a vibration mode having a frequency between about 6,010 hertz and about 22,650 hertz.

3. The head suspension assembly of claim 1, wherein the first structural damping material and the second structural damping material are substantially identical in composition.

4. The head suspension assembly of claim 1, wherein the hinge component applies a preload on the transducing head through the beam component.

5. The head suspension assembly of claim 1, wherein the entire hinge component is substantially made from the first structural damping material only.

6. The head suspension assembly of claim 1, wherein the entire gimbal component is substantially made from the second structural damping material only.

7. The head suspension assembly of claim 1, wherein the hinge component has no external structural damping material attached thereto.

8. The head suspension assembly of claim 1, wherein the first structural damping material has a modulus of elasticity greater than approximately 50 gigapascals in a vibration mode having a frequency between about 6,010 hertz and about 22,650 hertz.

9. The head suspension assembly of claim 1, wherein the second structural damping material has a modulus of elasticity greater than approximately 50 gigapascals in a vibration mode having a frequency between about 6,010 hertz and about 22,650 hertz.

10. The head suspension assembly of claim 1, wherein the first structural damping material is an alloy.

11. The head suspension assembly of claim 1, wherein the first structural damping material is a laminate comprising a stainless steel layer and a damping material layer.

12. The head suspension assembly of claim 1, wherein the at least one of the hinge component and the gimbal component is attached to the beam component through an adhesive.

13. The head suspension assembly of claim 1, wherein the at least one of the hinge component and the gimbal component is attached to the beam component by welding.

14. The head suspension assembly of claim 1, wherein the first structural damping material is a composite.

15. A head suspension assembly, comprising:
a beam component having a front end and a rear end;
a hinge component for connecting to an actuation arm, wherein the hinge component consists essentially of a first structural damping material having a modulus of elasticity greater than approximately 10 gigapascals and a damping capacity greater than approximately 0.02 in a vibration mode having a frequency between about 6,010 hertz and about 22,650 hertz, and the hinge component is separately made and attached to the rear end of the beam component; and
a gimbal component near the front end of the beam component for connecting to a slider assembly carrying a transducer.

16. The head suspension assembly of claim 15, wherein the first structural damping material is an alloy.

17. The head suspension assembly of claim 15, wherein the gimbal component comprises a second structural damping material having a modulus of elasticity greater than approximately 10 gigapascals and a damping capacity greater than approximately 0.02 in a vibration mode having a frequency between about 6,010 hertz and about 22,650 hertz.

18. The head suspension assembly of claim 17, wherein the first structural damping material and the second structural damping material are substantially identical in composition.

19. The head suspension assembly of claim 17, wherein the second structural damping material is an alloy.

20. The head suspension assembly of claim 17, wherein the second structural damping material is a laminate comprising a stainless steel layer and a damping material layer.

21. The head suspension assembly of claim 17, wherein the second structural damping material is a composite.

22. The head suspension assembly of claim 15, wherein the first structural damping material is a laminate comprising a stainless steel layer and a damping material layer.

23. The head suspension assembly of claim 15, wherein the first structural damping material is a composite.

24. The head suspension assembly of claim 1, wherein the second structural damping material is an alloy.

* * * * *